United States Patent Office 2,912,280
Patented Nov. 10, 1959

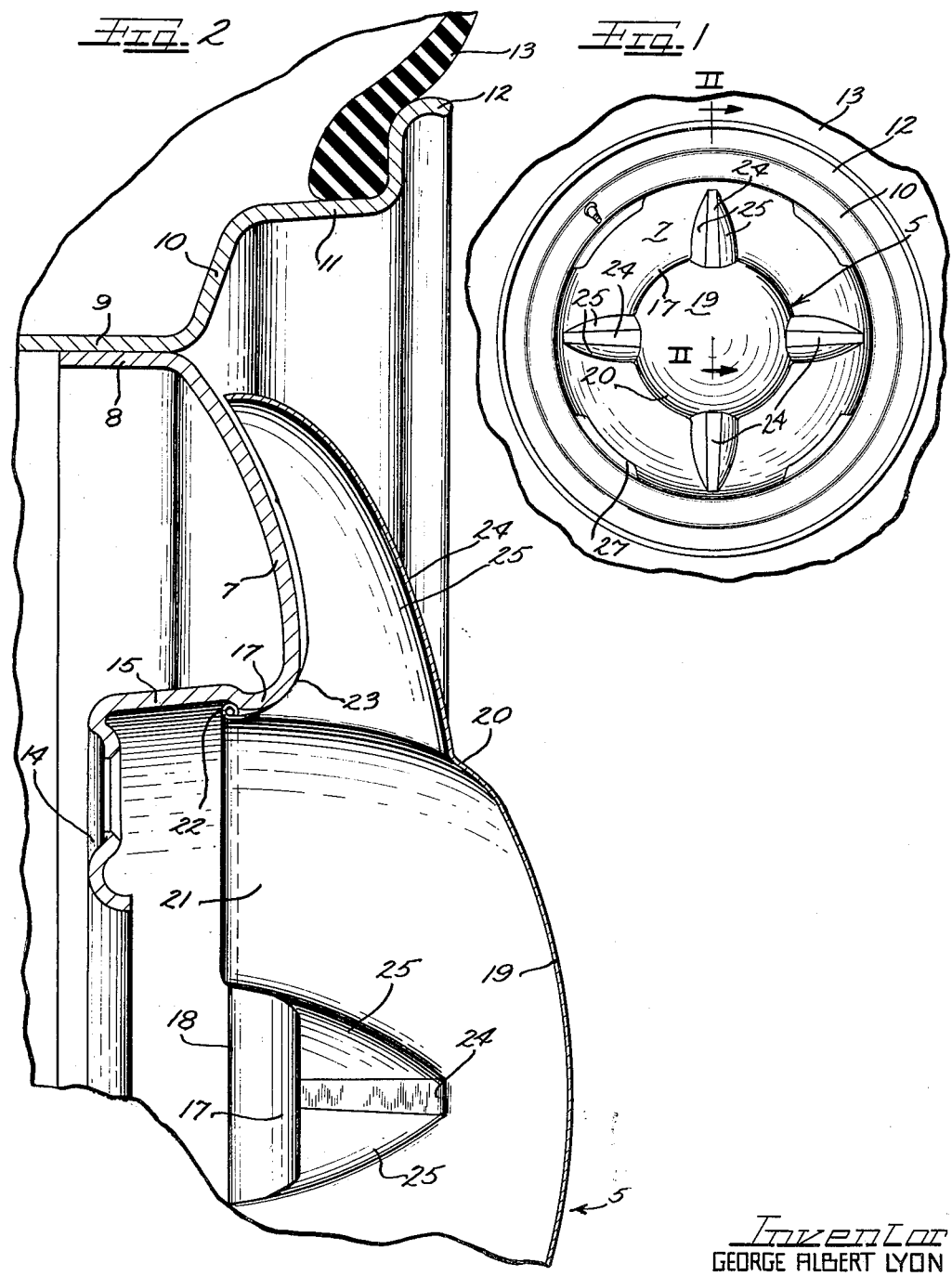

2,912,280
WHEEL COVER

George Albert Lyon, Detroit, Mich.

Application December 2, 1955, Serial No. 550,610

6 Claims. (Cl. 301—37)

The present invention relates to improvements in wheel structures and more particularly concerns the ornamental and protective covering of the outer sides of vehicle wheels.

An important object of the present invention is to provide a wheel structure with novel cover means for the outer side thereof.

Another object of the invention is to provide a novel wheel structure and cover combination.

A further object of the invention is to provide improved means in a wheel structure for retaining a cover on the outer side of the wheel.

It is a further object of the invention to provide an improved wheel cover for disposition at the outer side of a vehicle wheel.

Yet another object of the invention is to provide a novel hub cap type wheel cover for disposition over the outer side of a vehicle wheel.

It is also an object of the invention to provide improved cover retaining means on a vehicle wheel cover.

Other objects, features and advantages of the present invention will be readily apparent from the following detailed description of certain preferred embodiments thereof taken in conjunction with the accompanying drawing in which:

Figure 1 is an outer side elevational view of a vehicle wheel embodying features of the invention; and Figure 2 is an enlarged fragmentary radial sectional view taken substantially on the line II—II of Figure 1.

As shown, a wheel cover 5 is constructed and arranged to be applied in press-on, pry-off relation to the outer side of a vehicle wheel which includes a wheel body 7 preferably of the disk spider type pressed from suitable heavy gauge sheet metal such as sheet steel, and provided with a generally axially inwardly extending outer marginal attachment flange 8 secured in suitable fashion to a radially inwardly facing annular base flange 9 of a multiflange tire rim. At the radially outer side the tire rim has the usual side flange 10, an intermediate flange 11 and a terminal flange 12, the flanges being constructed and related to support a tire and tube assembly or a tubeless pneumatic tire 13, as preferred.

At its center, the wheel body 7 is provided with an inwardly dished bolt-on flange 14 which is adapted to be secured by attachment bolts to the part of a vehicle axle such as the usual flange thereon provided for this purpose. Joining the bolt-on flange 14 to the main body portion of the wheel body 7 is an annular generally radially inwardly facing but preferably axially outwardly sloping intermediate flange 15. At juncture of the wheel body flange 15 with the main body portion of the flange is preferably provided a generally radially inwardly projecting annular cover retaining rib 17 which also serves as a reinforcing rib. For cover retaining purposes, the rib 17 has a more or less undercut, radially and axially inwardly facing annular shoulder 18.

According to the present invention, the cover 5 is preferably made as a one piece stamped or drawn sheet metal shell. Suitable materials for the shell of the cover 5 may comprise sheet steel strip or plate of suitable drawing and cold working type including stainless steel, or brass or aluminum alloy may also be used. A central circular body or crown portion 19 of the cover or cap 5 has a generally axially inwardly directed side wall 20 of a diameter to telescope into the shouldered retaining rib 17 of the wheel body.

For press-on, pry-off engagement of the cover member 5 with the wheel, the side wall 20 is provided with means for engagement with the wheel body and more particularly with the retaining shoulder rib 17. To this end, the side wall is provided with a plurality of circumferentially arcuate, substantial width, radially flexible, axially inward marginal extensions 21 provided with turned retaining terminals 22 engageable behind and with the retaining shoulder 18. In a preferred form the terminals 22 are extremity beads turned generally radially outwardly and toward the radially outer faces of the retaining extension flanges 21.

In order to maintain the retaining terminal beads 22 in firm gripping tensioned engagement with the retaining shoulder 18, shoulder means 23 are provided on the cover wall 20 axially outwardly relative to the retaining beads 22 and at the respective sides of the retaining flange extensions 21 for engaging the wheel body 7 adjacent juncture of the retaining rib 17 therewith for limiting axially inward disposition of the cover. The spacing between the axially outer side of the beads 22 and the shoulders 23 is such with respect to the axial dimension between the shoulder 18 and the adjacent axially outer surface of the wheel body 7 that in the fully assembled relation of the cover with the wheel, with the retaining beads 22 cammingly engaging the shoulder 18, the shoulders 23 are drawn tightly against the wheel body and the retaining beads 22 are cammingly grippingly drawn tight against the shoulder 18.

In the present instance the shoulders 23 are provided in connection with means that enhance the resilience of the retaining terminals 21. Such means also enhance the ornamental appearance of the cover. To this end, the side wall 20 is provided integrally in one piece therewith with respective generally radially extending spoke-like arms or horns 24 between and connecting the respective retaining extensions 21, with the stop shoulders 23 comprising portions of the edges of respective side wall flanges or wings 25 of the arms contiguous juncture of the arms with the axially inner portions of the retaining extensions. By preference the side wall flanges 25 of the arms flare or diverge from the longitudinal crests or ridges of the arms in more or less lance-shaped form and outwardly convex, but with the edges of the side flanges generally complementary to and following the radial shape or contour of the wheel body 7 so as to appear from the outer side of the wheel, in assembly with the wheel, as generally emanating therefrom. As shown, the tips of the arms 24 preferably merge with the radially outer extremities of the arm side wall or flange edges. At their radially inner ends, the crests as well as the arm side wall flanges merge with the cover side wall 20 and the retaining extensions 21, with the radially inner extremity portions of the side wall flange edges at and radially inwardly adjacent the shoulders 23 generally following the curvature of the opposing portion of the retaining rib 17 so that at their radially inner ends the side wall flanges 25 are the widest at juncture with the retaining extensions 21 and extending as close as practicable to the axially inner ends of the extensions. Thereby, a highly desirable resiliency reinforcing relationship of the arms 24 and more particularly the side wall flanges 25 thereof with the retaining extensions 21 is attained.

In applying the cover member 5 to the wheel, it is generally centered with respect to the wheel body 7, and the retaining extension flange terminals 22 engage against the retaining rib 17 and in response to axially inward pressure against the crown 19 cam axially inwardly and are deflected radially inwardly by resilient radially inward deflection of the extensions 21 until the retaining terminals 22 snap in behind the retaining shoulder 18. Resilient radially inward deflection of the extensions 21 is accompanied by resilient radially inward and relative collapsing resilient flexure movement of the arms 24 and more particularly the side wall flanges 25 thereof conformable to radially inward drawing resilient deflection of the extensions 21. Then as the retaining extensions 21 flex under resilient tension radially outwardly as the terminals 22 move in behind the shoulder 18, a strong loaded spring action is exerted on the extensions 21 by the arms 24 causing the extensions 21 to expand toward their normal diameter. However, since the arm shoulders 23 limit the axially inward movement of the cover on the wheel, the retaining terminals 22 are held in tensioned gripping engagement with the sloping shoulder 18.

Since the shoulders 23 are edges of the arm side wall flanges 25, they serve incident to the drawing of the same tight against the wheel body to hold the cap cover member 5 against tendency to turn relative to the wheel. This is desirable to maintain the arms 24 in predetermined relation to other components of the wheel structure, and particularly where it is desired to maintain the arms 24 more or less oriented relative to chain slots or wheel openings 27 (Fig. 1). Removal of the cover 5 from the wheel is effected by snapping the retaining extensions 21 out of engagement with the retaining rib 17.

It will be understood that modifications and variations may be effected without departing from the scope of the novel concepts of the present invention.

I claim as my invention:

1. In a wheel structure including a wheel body having a depressed central portion defined by a generally axially extending and radially inwardly facing flange joining a generally radially outwardly extending and axially outwardly facing portion of the wheel body, a cover member for disposition at the outer side of the wheel including a central cap portion having a generally axially inwardly extending side wall with generally axially inward extensions alternating with horn-like generally radially outwardly extending hollow arms integral in one piece therewith and provided with side walls that join the side wall extensions of the cover member cap but with the extensions projecting axially inwardly beyond the adjacent portions of the side walls of the arms, the axially extending flange of the wheel body being provided adjacent its axially outer portion with generally radially inwardly projecting shoulder means providing a generally radially and axially inwardly facing cover retaining shoulder, said extensions being provided with retaining terminals engageable with said shoulder.

2. In a wheel structure including a wheel body having a depressed central portion defined by a generally axially extending and radially inwardly facing flange joining a generally radially outwardly extending and axially outwardly facing portion of the wheel body, a cover member for disposition at the outer side of the wheel including a central cap portion having a generally axially inwardly extending side wall with generally axially inward extensions alternating with horn-like generally radially outwardly extending hollow arms integral in one piece therewith and provided with side walls that join the side wall extensions of the cover member cap but with the extensions projecting axially inwardly beyond the adjacent portions of the side walls of the arms, the axially extending flange of the wheel body being provided adjacent its axially outer portion with generally radially inwardly projecting shoulder means providing a generally radially and axially inwardly facing cover retaining shoulder, said extensions being provided with retaining terminals engageable with said shoulder, said arms having portions of the side walls thereof engageable with the axially outwardly facing wheel portion to delimit axially inward disposition of the cover and cooperating with said terminal structure to maintain the same under resilient tensioned engagement with said wheel shoulder structure.

3. In a wheel structure including a wheel body having a central depression, a cover for disposition at the outer side of the wheel including a generally axially extending wall flange having extensions telescopically disposable within said depression for generally centering the cover and with generally spoke-like arms projecting from said wall intermediate the projections for overlying the wheel body radially outwardly from said depression and defining the axially inward disposition of the cover relative to the wheel, and with cover retaining means on the wheel body and on the cover interengageable in press-on, pry-off relation.

4. In a wheel structure including a wheel body having a central depression, a cover for disposition at the outer side of the wheel including a generally axially extending wall flange having extensions telescopically disposable within said depression for generally centering the cover and with generally spoke-like arms projecting from said wall intermediate the projections for overlying the wheel body radially outwardly from said depression and defining the axially inward disposition of the cover relative to the wheel, and with cover retaining means on the wheel body and on the cover interengageable in press-on, pry-off relation, said retaining means on the cover comprising terminals on said extensions.

5. In a cover member for disposition at the outer side of a vehicle wheel, a generally circular cover member body having a generally axially extending side wall with resilient extensions thereon and alternating hollow axially and radially inwardly opening arms projecting radially from said side wall, and with the extensions projecting axially inwardly beyond adjacent side wall portions of the arms and resiliently merging and integrated with the side wall portions of the arms.

6. In a cover member for disposition at the outer side of a vehicle wheel, a generally circular cover member body having a generally axially extending side wall with resilient extensions thereon and alternating hollow axially and radially inwardly opening arms projecting radially from said side wall, and with the extensions projecting axially inwardly beyond adjacent side wall portions of the arms and resiliently merging and integrated with the side wall portions of the arms, said extensions having retaining terminals thereon engageable in press-on, pry-off relation with a portion of a wheel.

References Cited in the file of this patent

UNITED STATES PATENTS

| 2,008,933 | Sinclair | July 23, 1935 |
| 2,148,211 | Lyon | Feb. 21, 1939 |
| 2,239,898 | Lyon | Apr. 29, 1941 |

FOREIGN PATENTS

| 520,098 | Great Britain | Apr. 15, 1940 |
| 1,041,268 | France | May 27, 1953 |